(12) United States Patent
McGuire, Jr.

(10) Patent No.: US 8,593,760 B2
(45) Date of Patent: Nov. 26, 2013

(54) HARD DISK DRIVES WITH ELECTRICAL CONNECTORS COMPRISING A FLEXIBLE CIRCUIT EXTENDING THROUGH AN OPENING IN THE BASE AND RELATED METHODS

(75) Inventor: James E. McGuire, Jr., Westerville, OH (US)

(73) Assignee: entrotech, inc., Columbus, OH (US)

( * ) Notice: Subject to any disclaimer, the term of this patent is extended or adjusted under 35 U.S.C. 154(b) by 0 days.

(21) Appl. No.: 13/096,557

(22) Filed: Apr. 28, 2011

(65) Prior Publication Data
US 2012/0275056 A1 Nov. 1, 2012

(51) Int. Cl.
*G11B 33/12* (2006.01)
*G11B 25/04* (2006.01)

(52) U.S. Cl.
USPC .................................. 360/99.24; 360/99.16

(58) Field of Classification Search
USPC .......... 360/99.23, 99.24, 99.25, 99.16, 264.2, 360/266.3
See application file for complete search history.

(56) References Cited

U.S. PATENT DOCUMENTS

| | | | |
|---|---|---|---|
| 4,306,259 A | 12/1981 | Saito et al. | |
| 4,367,503 A | 1/1983 | Treseder | |
| 4,642,715 A | 2/1987 | Ende | |
| 4,686,592 A | 8/1987 | Carroll et al. | |
| 4,855,849 A * | 8/1989 | Jones et al. | 360/99.23 |
| 4,965,691 A | 10/1990 | Iftikar et al. | |
| 5,025,335 A | 6/1991 | Stefansky | |
| 5,175,657 A | 12/1992 | Iftikar et al. | |
| 5,214,550 A | 5/1993 | Chan | |
| 5,233,491 A | 8/1993 | Kadonaga et al. | |
| 5,235,481 A | 8/1993 | Kamo et al. | |
| 5,243,495 A | 9/1993 | Read et al. | |
| 5,247,410 A | 9/1993 | Ebihara et al. | |
| 5,253,129 A | 10/1993 | Blackborow et al. | |
| 5,270,887 A * | 12/1993 | Edwards et al. | 360/99.16 |
| 5,282,099 A | 1/1994 | Kawagoe et al. | |
| 5,317,463 A | 5/1994 | Lemke et al. | |
| 5,454,157 A | 10/1995 | Ananth et al. | |

(Continued)

FOREIGN PATENT DOCUMENTS

| | | |
|---|---|---|
| EP | 0 546 680 | 6/1993 |
| JP | 6-218799 | 8/1994 |
| WO | WO 2005/117018 | 12/2005 |

OTHER PUBLICATIONS

"Donaldson Filtration Solutions Adsorbent Label Filter (ALF): Disk Drive," Donaldson Company, Inc., Minneapolis, MN (Jul. 31, 2010).

(Continued)

*Primary Examiner* — Craig A. Renner
(74) *Attorney, Agent, or Firm* — The Griffith Law Firm, A P.C.; Lisa M. Griffith

(57) ABSTRACT

An improved hard disk drive of the invention comprises a housing, which comprises a base and a cover. The hard disk drive further internally comprises at least one disk for storage of data within the housing and an actuator for reading and recording of the data on the at least one disk. An electrical connector comprising a flexible circuit extends through an opening in the base and provides electrical contact between electronics external to the housing and one or more components within the hard disk drive. Methods for forming the improved hard disk drives are also disclosed.

20 Claims, 4 Drawing Sheets

(56) References Cited

U.S. PATENT DOCUMENTS

| | | | |
|---|---|---|---|
| 5,536,917 A | 7/1996 | Suppelsa et al. | |
| 5,587,854 A | 12/1996 | Sato et al. | |
| 5,587,855 A | 12/1996 | Kim | |
| 5,608,592 A | 3/1997 | Mizoshita et al. | |
| 5,703,735 A | 12/1997 | Bleeke | |
| 5,732,063 A | 3/1998 | Chen | |
| 5,751,514 A | 5/1998 | Hyde et al. | |
| 5,781,373 A | 7/1998 | Larson et al. | |
| 5,837,934 A | 11/1998 | Valavanis et al. | |
| 5,880,904 A | 3/1999 | Mizoshita et al. | |
| 5,898,537 A | 4/1999 | Oizumi et al. | |
| 5,969,901 A | 10/1999 | Eckberg et al. | |
| 6,008,965 A | 12/1999 | Izumi et al. | |
| 6,023,392 A | 2/2000 | Kim | |
| 6,108,164 A | 8/2000 | Weber, Jr. | |
| 6,129,579 A * | 10/2000 | Cox et al. | 360/99.18 |
| 6,168,459 B1 * | 1/2001 | Cox et al. | 360/99.18 |
| 6,181,530 B1 | 1/2001 | Ratliff et al. | |
| 6,226,143 B1 | 5/2001 | Stefanksy | |
| 6,236,532 B1 | 5/2001 | Yanagisawa | |
| 6,243,262 B1 | 6/2001 | Koo et al. | |
| 6,317,286 B1 | 11/2001 | Murphy et al. | |
| 6,392,838 B1 | 5/2002 | Hearn et al. | |
| 6,397,932 B1 | 6/2002 | Calaman et al. | |
| 6,407,659 B2 | 6/2002 | Mochida et al. | |
| 6,430,000 B1 | 8/2002 | Rent | |
| 6,442,021 B1 | 8/2002 | Bolognia et al. | |
| 6,469,864 B2 | 10/2002 | Kamezawa et al. | |
| 6,473,264 B2 | 10/2002 | Bae et al. | |
| 6,480,353 B1 | 11/2002 | Sacks et al. | |
| 6,525,899 B2 | 2/2003 | Hearn et al. | |
| 6,560,064 B1 | 5/2003 | Hirano | |
| 6,570,736 B2 | 5/2003 | Noda | |
| 6,646,821 B2 | 11/2003 | Bernett et al. | |
| 6,650,961 B2 | 11/2003 | Deckers | |
| 6,678,112 B1 * | 1/2004 | Kaneko | 360/99.25 |
| 6,693,767 B1 | 2/2004 | Butler | |
| 6,762,909 B2 | 7/2004 | Albrecht et al. | |
| 6,765,751 B2 | 7/2004 | Huang et al. | |
| 6,785,082 B2 | 8/2004 | Fiorvanti et al. | |
| 6,831,811 B1 | 12/2004 | Andrikowich et al. | |
| 6,876,514 B1 | 4/2005 | Little | |
| 6,934,118 B2 | 8/2005 | Hidaka et al. | |
| 6,934,958 B2 | 8/2005 | Lin et al. | |
| 6,940,687 B2 | 9/2005 | Hong et al. | |
| 7,082,012 B2 | 7/2006 | MacPherson et al. | |
| 7,119,984 B2 | 10/2006 | Macleod et al. | |
| 7,206,164 B2 | 4/2007 | Hofland et al. | |
| 7,218,473 B2 | 5/2007 | Bernett et al. | |
| 7,239,593 B2 | 7/2007 | Abe | |
| 7,274,534 B1 | 9/2007 | Choy et al. | |
| 7,300,500 B2 | 11/2007 | Okada et al. | |
| 7,301,776 B1 | 11/2007 | Wang et al. | |
| 7,315,447 B2 | 1/2008 | Inoue et al. | |
| 7,330,334 B2 | 2/2008 | Shimizu et al. | |
| 7,362,541 B2 | 4/2008 | Bernett et al. | |
| 7,414,813 B2 | 8/2008 | Huynh | |
| 7,420,771 B1 | 9/2008 | Hanke et al. | |
| 7,484,291 B1 | 2/2009 | Ostrander et al. | |
| 7,508,622 B2 | 3/2009 | Martin et al. | |
| 7,525,758 B2 | 4/2009 | Abe | |
| 7,616,400 B2 | 11/2009 | Byun et al. | |
| 7,630,169 B2 | 12/2009 | Murakami | |
| 7,684,146 B1 | 3/2010 | Andrikowich et al. | |
| 7,813,129 B2 | 10/2010 | Van Der Werff | |
| 8,014,167 B2 | 9/2011 | Gunderson et al. | |
| 8,018,687 B1 | 9/2011 | Little et al. | |
| 8,248,777 B2 | 8/2012 | Prest | |
| 8,274,755 B2 | 9/2012 | Ishima et al. | |
| 8,427,787 B2 | 4/2013 | McGuire, Jr. | |
| 2001/0042301 A1 | 11/2001 | Khuu | |
| 2002/0149885 A1 | 10/2002 | Dague et al. | |
| 2002/0196580 A1 | 12/2002 | Tsukahara et al. | |
| 2003/0081349 A1 | 5/2003 | Bernett | |
| 2003/0089417 A1 | 5/2003 | Bernett | |
| 2003/0179488 A1 | 9/2003 | Kant et al. | |
| 2003/0179489 A1 | 9/2003 | Bernett et al. | |
| 2003/0223148 A1 | 12/2003 | Macleod et al. | |
| 2004/0150909 A1 | 8/2004 | Kimura et al. | |
| 2004/0184184 A1 * | 9/2004 | Komatsu et al. | 360/99.24 |
| 2004/0207980 A1 | 10/2004 | Kobayashi | |
| 2005/0013039 A1 | 1/2005 | Matsumura et al. | |
| 2005/0094312 A1 | 5/2005 | Sato | |
| 2005/0130457 A1 * | 6/2005 | Nozaki et al. | 439/67 |
| 2005/0237708 A1 | 10/2005 | Chen | |
| 2006/0050429 A1 | 3/2006 | Gunderson et al. | |
| 2007/0002489 A1 | 1/2007 | Abe | |
| 2007/0171567 A1 | 7/2007 | Choi et al. | |
| 2008/0174910 A1 | 7/2008 | Hirono et al. | |
| 2008/0212237 A1 | 9/2008 | Uefune et al. | |
| 2008/0226534 A1 | 9/2008 | Gidumal et al. | |
| 2009/0073328 A1 | 3/2009 | Gunderson et al. | |
| 2009/0073842 A1 | 3/2009 | Kim | |
| 2009/0116141 A1 | 5/2009 | Brown | |
| 2009/0183475 A1 | 7/2009 | Dauber et al. | |
| 2011/0122567 A1 | 5/2011 | Cheah et al. | |
| 2011/0212281 A1 | 9/2011 | Jacoby et al. | |
| 2012/0275052 A1 | 11/2012 | McGuire, Jr. et al. | |
| 2012/0275053 A1 | 11/2012 | McGuire, Jr. | |
| 2012/0275054 A1 | 11/2012 | McGuire, Jr. et al. | |
| 2012/0275055 A1 | 11/2012 | McGuire, Jr. | |
| 2012/0275057 A1 | 11/2012 | McGuire, Jr. | |
| 2012/0275105 A1 | 11/2012 | McGuire, Jr. | |
| 2012/0275106 A1 | 11/2012 | McGuire, Jr. | |
| 2012/0275285 A1 | 11/2012 | McGuire, Jr. | |
| 2012/0275286 A1 | 11/2012 | McGuire, Jr. | |
| 2012/0275287 A1 | 11/2012 | McGuire, Jr. et al. | |

OTHER PUBLICATIONS

"Donaldson Filtration Solutions Adsorbent Pouch Filter (APF): Disk Drive," Donaldson Company, Inc., Minneapolis, MN (Jul. 31, 2010).
"Infrared," http://en.wikipedia.org/wiki/Infrared (Feb. 14, 2011).
"Laser Makes Invisible Welds in Plastics," Connect, No. 100; http://www.twi.co.uk/content/c1008b.html (May 31, 1999).
"Laser Welding of Plastics (Knowledge Summary)," http://www.twi.co.uk/content/ksab002.html (Dec. 31, 2009).
"Nd:YAG laser," http://en.wikipedia.org/wiki/Nd:YAG_laser (Feb. 14, 2011).
Jones, Ian, "Clearweld (Knowledge Summary)," http://www.twi.co.uk/content/ksiaj001.html (Dec. 31, 2010).
Venkat, Sri et al., "Sealing Plastic Seams With Laser Welding," www.devicelink.com/mddi (May 31, 2008).
Warwick, Marcus et al., "Application Studies Using Through-Transmission Laser Welding of Polymers," http://www.twi.co.uk/content/spcmwapr2006.html (Apr. 25, 2006).

* cited by examiner

HARD DISK DRIVES WITH ELECTRICAL CONNECTORS COMPRISING A FLEXIBLE CIRCUIT EXTENDING THROUGH AN OPENING IN THE BASE AND RELATED METHODS

BACKGROUND OF THE INVENTION

The present invention relates generally to hard disk drives with improved electrical connectors and related methods.

A disk drive is a device used to store information in a computing environment. In a disk drive, data is generally recorded on planar, round, rotating surfaces (which are commonly referred to as disks, discs, or platters). There are several types of disk drives, including optical disk drives, floppy disk drives, and hard disk drives. Nowadays, hard disk drives tend to be most common. Strictly speaking, "drive" refers to a device distinct from its medium, such as a tape drive and its tape, or a floppy disk drive and its floppy disk. A hard disk drive (sometimes referred to as a HDD), also referred to as a hard drive, hard disk, or fixed disk drive, is a non-volatile storage device that stores digitally encoded data on rapidly rotating platters with magnetic surfaces. Early hard disk drives had removable media; however, a HDD today is typically an encased unit with fixed media.

A typical hard disk drive includes a head disk assembly (HDA) and a printed circuit board assembly (PCBA) attached to a disk drive base of the HDA. The HDA typically includes at least one magnetic disk, a spindle motor for rotating the disk, and a head stack assembly (HSA) having an actuator assembly with at least one transducer head, typically several, for reading and writing data from the disk. The PCBA includes a servo control system in the form of a disk controller for generating servo control signals. The HSA is controllably positioned in response to the generated servo control signals from the disk controller. In so doing, the attached heads are moved relative to tracks disposed upon the disk. The heads are typically distanced from the magnetic disk by a gaseous cushion—so that they are said to "fly" over the disk. Thus, it is important that the position of the heads be well-controlled for proper reading and writing from the disk.

Hard disk drives are generally sealed to prevent dust and other external sources of contamination from interfering with operation of the hard disk heads therein. Some hard disk drives are hermetically sealed. A hermetic seal is generally understood to be an airtight seal. Note that some seals (e.g., those "sealing" air within the hard disk drive) are not literally air tight, but rather utilize an extremely fine air filter in conjunction with air circulation inside the hard drive enclosure. The spinning of the disks causes air to circulate therein, forcing any particulates to become trapped on the filter. The same air currents also act as a gas bearing, which enables the heads to float on a cushion of air above the surfaces of the disks. However, "hermetically" sealed means that the seal is so airtight that the disk drive's internal pressure is substantially independent of the external or ambient pressure. This is in contrast to a conventional or non-hermetically sealed disk drive that has a breather port with a filter in a wall of the base plate or cover for equalizing the disk drive's internal pressure with the external pressure. Thus, a hermetically sealed drive does not contain a breather port.

Within a hermetically sealed hard disk drive, gases other than atmospheric air are often employed. Filling the sealed environment of a hard disk drive with gases other than air can enhance their performance. For example, use of lower density inert gases, such as helium, can reduce aerodynamic drag between the disks and their associated read/write heads by a factor of approximately five-to-one as compared to their operation in air. This reduced drag beneficially results in reduced power requirements for the spindle motor. A helium-filled drive, thus, uses substantially less power than a comparable hard disk drive operating in an air environment. At the same time, the helium gas also conducts heat generated during operation of the disk drive away more effectively than air.

Hermetically sealed hard disk drives are first filled with a desired gaseous medium (whether it be atmospheric air or one or more other gases) before operation. Then, if the constituency of the gaseous medium substantially changes due to leakage of the hard disk drive housing, the hard disk drive must be either discarded or refilled with the desired gaseous medium. Filling disk drives to a desired pressure and concentration of gaseous components, however, can be both time-consuming and difficult. A number of patent documents focus on providing and/or replenishing gases such as helium at a desired concentration within a hard disk drive. See, for example, U.S. Patent Publication Nos. 2003/0081349 and 2003/0089417. Also see U.S. Pat. No. 6,560,064.

Due to imperfect sealing of hard disk drive housings, the benefits of using lower density gases such as helium are conventionally not longstanding. Potential paths of gas leakage (allowing both air flow into the hard disk drive housing and allowing gas outflow from the hard disk drive housing) are throughout the hard disk drive. Those potential paths of gas leakage include those associated with the junction of two mating components thereof. Those components include, for example, screws or other mechanical fasteners used to conventionally fasten multiple parts of the housing together. A further potential path of gas leakage is associated with the electrical connector and its exit from the hard disk drive housing. In addition, gasket seals and the like used to improve the seal between multiple components are often susceptible to at least some leakage. As gas, such as helium, leaks out of a sealed hard disk drive, air leaks in (or vice versa), causing undesirable effects in the operation of the disk drives—even possibly causing the disk drives to catastrophically fail. For example, an increased concentration of air inside the hard disk drive may increase forces on the read/write head therein due to turbulent airflow within the drive. Further, such undesired air may cause the read/write heads to "fly" at too great a distance above the disks. The risk of unexpected failure due to inadequate concentration of helium within such drives is a considerable drawback to helium-filled disk drives, particularly since the data stored within the disk drive can be irretrievably lost if the disk drive fails.

Elimination of or minimization of leakage is desired for not only better containment of gas within a hard disk drive, but for other reasons as well. One such reason relates to a reduction of complications arising from electromagnetic interference. Electromagnetic interference ("EMI," also called radio frequency interference or "RFI") is a usually undesirable disturbance caused in an electrical circuit by electromagnetic radiation emitted from an external source. Such disturbance may interrupt, obstruct, or otherwise degrade or limit the effective performance of the circuit. EMI can be induced intentionally for radio jamming, as in some forms of electronic warfare, or unintentionally, as a result of spurious emissions and responses, intermodulation products, and the like. A source of EMI may be any object, artificial or natural, that carries rapidly changing electrical currents, such as another electrical circuit or even the sun or Northern Lights. Broadcast transmitters, two-way radio transmitters, paging transmitters, and cable television are also potential sources of EMI within residential and commercial environments. Other potential sources of EMI include a wide variety of common household devices, such as doorbell transformers, toaster ovens, electric blankets, ultrasonic pest controls (e.g., bug zappers), heating pads, and touch-controlled lamps. It is known that EMI frequently affects the reception of AM radio in urban areas. It can also affect cell phone, FM radio, and television reception, although to a lesser extent. EMI can similarly affect performance of a computer.

In conventional hard disk drives, as with potential paths of gas leakage, unwanted and potentially problematic EMI wavelengths can enter a disk drive through a number of places. Within integrated circuits, the most important means of reducing EMI are: the use of bypass or "decoupling" capacitors on each active device (connected across the power supply and as close to the device as possible), risetime control of high-speed signals using series resistors, and VCC filtering. If all of these measures still leave too much EMI, shielding such as using radio frequency (RF) gasket seals (which are often very expensive) and copper tape has been employed. Another method of reducing EMI is via use of metal hard disk drive components. While the use of metal components undesirably increases the overall weight of an apparatus, use of metal components has been conventionally mandated in the hard disk drive industry due to the EMI sensitivity of mechanical spinning components therein. Without mechanical spinning components therein, however, manufacturers of flash drives have taken advantage of the benefits of, for example, a plastic case for enclosure of the drive. See, for example, U.S. Pat. No. 7,301,776, which describes how metal material used for top and bottom plates of the drives described therein can be replaced by plastic as there are fewer EMI issues associated with flash memory devices as compared to mechanical spinning hard disk drives.

As discussed in U.S. Patent Publication No. 2003/0179489, despite the advantages of helium-filled drives, such drives have not been commercially successful. This is mainly due to problems associated with leakage of gas from within the drives over time. Unlike air-filled disk drives, helium-filled drives do not include a filtered port to equalize the pressure within the drive to the ambient pressure—which ensuing pressure differential contributes to increased leakage of gas. Thus, while prior art helium drives are completely "sealed" in the conventional sense, it is still possible for helium gas therein to leak out past conventional rubber gasket seals used to seal the top cover to the drive base. Such leakage is not surprising given the relatively smaller size (i.e., lower atomic weight) of the helium atoms in comparison to the constituent gases found in air (i.e., nitrogen and oxygen). That is, the rubber gasket seals on prior art drives allow the relatively smaller helium atoms to diffuse through the rubber membrane. Indeed, such prior art gasket seals do not provide hermetic seals with respect to air (i.e., the gasket seals are also permeable to the larger atoms of nitrogen and oxygen in air) since it is air that typically displaces the helium gas that leaks from the drive.

Most prior art gasket seals are only intended to keep relatively large contaminants such as dust or smoke from the interior of a disk drive. However, such gasket seals are preferred as compared to other, more permanent methods of sealing a drive for two main reasons. First, such seals typically do not outgas and, thus, do not contribute to the contamination of the interior of the drive. Secondly, such seals may be reused if necessary during the assembly of the disk drive, such as when an assembled drive fails to pass certification testing and must be "re-worked." Re-working a drive typically entails removing the top cover from the base and replacing a defective disk or read/write head while the drive is still in a clean room environment. The re-worked drive is then reassembled, which can even be done using the same rubber gasket seal positioned between the base and the top cover. Unfortunately, however, while such gasket seals are convenient, they simply often do not provide a sufficient hermetic seal to maintain the required concentration of helium (or other low density gas) within the disk drive for the desired service life of the drive.

In view of the potential for long-term performance problems, U.S. Patent Publication No. 2003/0179489 describes a disk drive assembly having a sealed housing. As described therein, a disc drive includes a base plate supporting a spindle motor and an actuator assembly. A structural cover is removably attached to the base plate to form an internal environment within the disc drive. The internal environment of the drive is filled with a low density gas such as helium, and a sealing cover is permanently attached to the base plate and the structural cover to form a hermetic seal that maintains a predetermined concentration of the low density gas within the internal environment over a service lifetime of the disc drive.

The disc drive further includes a first seal secured between the base plate and the structural cover to prevent contaminants from entering the internal environment of the disc drive. The first seal is formed from a material such as rubber that allows leakage of the low density gas from the internal environment at a sufficiently low rate so that the disc drive may be operated for a predetermined period of time in the absence of the sealing cover.

In one embodiment, the base plate includes a raised outer edge and the sealing cover includes a downward depending edge that is adhesively bonded within a groove formed between an outer surface of the structural cover and the raised outer edge of the base plate. Alternatively, the sealing cover may include a downward depending edge that is adhesively secured to an outer perimeter wall of the base plate. In an alternative embodiment, the sealing cover is soldered to a top surface of the raised outer edge of the base plate. Such assemblies purportedly create a hermetic seal that will maintain desired concentrations of helium (or other low density gases) within the drive over the operational lifespan of the drive (e.g., leaking helium at such a low rate that it would take over seventy years for the helium concentration to drop below a predetermined lower limit). However, such sealing covers are not without their limitations—e.g., those dimensional limitations discussed in U.S. Patent Publication No. 2003/0179489 and the potential interference of such sealing covers with electrical connectors, such as those associated with flex circuitry protruding from the disk drive. Thus, improvements are still needed.

In addition, while U.S. Patent Publication No. 2003/0223148 (corresponding to U.S. Pat. No. 7,119,984) discusses improved containment of helium within a hard disk drive, the methods therein rely on laser-based metal sealing of such drives. Further, such "sealing" of drives is incomplete in that it does not prevent leakage through valves and ports used to inject gas into disk drive housings once sealed as such. As described therein, a base can be combined with a cover by overlapping respectively corresponding coupling flanges of the base and cover with each other. The coupling flanges are then described as being jointed and fastened together by spot welding, but only if both of the base and cover are made of metal including iron. Alternatively, hermetic sealing to some extent is said to be guaranteed if seam-welding is effected by continuously carrying out spot welding. Alternatively, when the base and the cover are made of a metal other than iron or a resin material, the coupling flanges are described as being joined together by means such as wrap-seaming, screws, or riveting. Still further, if both the base and cover are made of metal including aluminum or made of a resin material, the coupling flanges are stated to be preferably jointed and fastened together by screws or rivets. Further, in the outer peripheral portion of the jointed coupling flanges, a frame composed of a pair of L-shaped frame elements can be attached to force the jointed coupling flanges to be closed up tightly. Each of these L-shaped frame elements are made of so-called engineering plastic, e.g., polyamide resin or polyphenylene sulfide resin, and have a sectional form with a recess corresponding to the outer shape of the jointed coupling flanges. In this case, the L-shaped frame elements are fixed to the jointed coupling flanges of the housing by adhesive or by welding the frame elements per se. Also see U.S. Pat. No. 6,762,909 for a description of laser welding of a disk drive's cover and base plate made of aluminum or other alloys. Similarly, U.S. Pat. No. 5,608,592 discusses how spot welding can be used to secure a base and cover of a disk drive housing.

U.S. Pat. No. 4,686,592 discloses a housing comprising a lower body portion and a cover portion. Lower body portion is stated to be cylindrical in shape, having a lip located towards the outer periphery and a ledge associated therewith. Cover portion is stated to have a lip portion along its outer periphery. The inner and outer diameter of the lips are selected so that the two lips nest with one another when the cover portion is placed over the lower body portion, i.e., the outer diameter of the lower body portion's lip is selected to be greater than the inner diameter of the cover portion's lip. Further, the height of the cover portion's lip is selected with respect to the height of the lower body portion's lip so that a groove is formed for accommodating the outer periphery of the disk. Adhesives, such as epoxy, can be applied in the groove to assist in fixedly securing the disk within the groove. The disk is further secured in the groove by the clamping action provided by the cover portion and the lower body portion. Alternative methods for securing the cover portion to the lower body portion described therein include: threading, cam-locking, radial crimping, laser welding, ultrasonic welding, and the like.

U.S. Pat. Nos. 6,392,838 and 6,525,899 disclose a disk drive assembly purportedly hermetically encased within a metallic can. The metallic can comprises a top and bottom housing. Each housing component includes a sealing flange extending around its periphery. After the disk drive assembly is securely placed into the bottom housing, the top and bottom housings are mated and sealed together by forming a seam seal with the seal flanges. Also disclosed is use of a metallic gasket seal having a C-shaped cross-sectional area to purportedly hermetically seal a disk drive assembly. The C-seal includes a base layer and a plating layer, with the length of the seal extending the periphery of the disk drive base, similar to conventional elastomer gasket seals. After the disk drive cover is placed over the disk drive base and C-seal, the cover is clamped, thus compressing the C-seal. The resulting compression forces the plating layer to fill surface asperities in the area of the disk drive cover and base that contact the C-seal. These configurations purportedly provide assemblies with atmosphere leak rates of less than one cubic centimeter per $10^8$ seconds or 5% of the volume of the sealed atmosphere over ten years.

No matter how a hard disk drive is individually configured and sealed, it must be configured to electrically couple with external components in a computing environment. As described in U.S. Pat. No. 5,454,157, information is transferred to and from drive platters within a disk drive through the magnetic read/write heads by way of flexcircuits that couple to the drive heads. Special flexible flexcircuits also couple the actuator arm in order to control the movement of this arm and the associated magnetic read/write heads. These flexcircuits must be able to couple to the read/write heads, the actuator arm movement device, and to the platter spin motor, which are all situated inside the sealed chamber. The other ends of these flexcircuits must be able to connect to the outside of the sealed chamber to a disk drive controller circuit on a PC board.

A typical prior art disk drive 110 is shown in FIG. 1. A base 101 is shown for providing a mounting surface for the actuator arm, the platters, and other drive mechanisms. Case 100 is placed over the base 101, the platters (not shown), and the actuator arm (not shown) in order to provide the sealed chamber. As is conventional, flexcircuits and connectors 103 and 102 are shown extending from the junction of the sealed chamber. The free ends of the connectors are exposed outside of the sealed chamber and the other ends are coupled within the chamber to the actuator arm movement, the read/write heads, and the platter spin motor (actuator). The cables 102 and 103 are standard flexible connectors and hook inside under the base 101 in order to connect to receiving connectors of a PC board located and mounted under the base 101 and acting as a hardware controller device. The flexcircuits 102 and 103 are placed through the junction of the base 101 and the case 100. In order to maintain the sealed chamber with these flexcircuits present in this junction, the junction of the case 100 and the base 101 are typically epoxy- or glue-sealed. The sealant flows around the irregularly shaped cables to insure a proper chamber. However, once the base 101 and the case 100 are sealed by epoxy, glue, or cement, they are permanently affixed together. This makes repair of the components located within the chamber problematic. Also, as the flexcircuits 102 and 103 outwardly extend from the disk drive unit, they often tear and rip if caught during manufacturing on an assembly line, which can destroy the entire hard disk drive.

In view of the number of potential problems impacting effective and long-term performance of hard disk drives, alternative methods and apparatus for improved hard disk drives are desired. Particularly desired are alternative methods and apparatus for providing efficient electrical connection between hard disk drives and external components, where such connection facilitates improved hermetic sealing of hard disk drives.

SUMMARY OF THE INVENTION

An improved hard disk drive of the invention comprises a housing, which comprises a base and a cover. The hard disk drive further internally comprises at least one disk for storage of data within the housing and an actuator for reading and recording of the data on the at least one disk. An electrical connector comprising a flexible circuit extends through an opening in the base and provides electrical contact between electronics external to the housing and one or more components within the hard disk drive. While more than one flexible circuit may exit the hard disk drive, the flexible circuit extending through an opening in the base is an actuator flex cable in an exemplary embodiment. As such, electrical contact between the electronics external to the housing and an actuator within the hard disk drive facilitates reading and recording of the data at any desired location on the at least one disk within the hard disk drive.

In one embodiment, the flexible circuit is embedded within the base of the hard disk drive. In an exemplary embodiment, the base comprises plastic. The flexible circuit can be embedded within the base by overmolding the plastic base around the flexible circuit.

Further advantages are obtained when the embedded flexible circuit comprises a tortuous path through the base. In one embodiment, the embedded flexible circuit comprises a labyrinth path through the base. In another embodiment, the embedded flexible circuit comprises a serpentine path through the base. The more tortuous the path, the more that changes of direction will occur throughout the path. In one embodiment, the embedded flexible circuit changes direction at least about three times. In another embodiment, the embedded flexible circuit changes direction at least about five times. In yet another embodiment, the embedded flexible circuit changes direction at least about seven times.

Further advantages can also be obtained when the opening within the base is non-linear. In one embodiment, position of a first end of the opening on the exterior of the hard disk drive is offset from position of a second end of the opening on the interior of the hard disk drive. According to a further embodiment, the opening extends essentially transversely from an exterior of the hard disk drive to approximately a midpoint of the base in an essentially linear manner, at which point the opening changes direction, extending essentially longitudinally within the base before changing direction and exiting the base essentially transversely toward an interior of the hard disk drive.

Methods for forming the improved hard disk drives are also disclosed. A method of forming an improved hard disk drive of the invention comprises steps of: providing the cover for the housing; providing the base for the housing; providing the electrical connector comprising the flexible circuit; positioning the flexible circuit within the opening of the base; enclosing the cover and the base around components internal to the hard disk drive; sealing the opening around the flexible circuit; and, optionally, evacuating and filling the hard disk drive with a desired gaseous medium when the desired gaseous medium is other than atmospheric air.

According to a further embodiment, the method comprises the step of embedding the flexible circuit within the base. In one variation of this embodiment, the flexible circuit is embedded between two adjacent layers within the base. In another variation of this embodiment, the flexible circuit is embedded within a single layer of the base. For example, the flexible circuit is overmolded within the base during molding of the base in one embodiment, such as when the base comprises plastic.

BRIEF DESCRIPTION OF THE DRAWINGS

Note that the components and features illustrated in all figures throughout this application are not necessarily drawn to scale and are understood to be variable in relative size and placement. Similarly, orientation of many of the components and features within the figures can vary such that, for example, a horizontal configuration could be readily reoriented to a vertical configuration, and vice versa, as desired.

DETAILED DESCRIPTION OF THE PREFERRED EMBODIMENTS OF THE INVENTION

The present invention is beneficially applied in conjunction with any suitable conventional hard disk drive in need of performance improvements. According to the present invention, an electrical connector comprising a flexible circuit extends through an opening in the base and provides electrical contact between electronics external to the housing and one or more components (e.g., an actuator) within the hard disk drive. Thus, unlike conventional hard disk drives, flexible circuits are removed from and do not disrupt the sealed interface between housing components. Due to the often complicated configurations used to adequately seal the housing components together, removing the electrical connector from the interface between the base and the cover of conventional hard disk drive housings is advantageous in that it facilitates greater design flexibility and more effective hermetic sealing of hard disk drives. Further, preferred embodiments of the invention minimize potential paths for leakage of gas and electromagnetic interference (EMI) within the electrical connector itself.

A disk drive assembly conventionally includes a base to which various components of the disk drive are mounted. A top cover cooperates with the base to form a housing that defines an encased environment for the disk drive. Any disk drive comprises any of a number of suitable components encased within the housing. The components within the disk drive include, for example, a spindle motor, which rotates one or more magnetic disks at a constant high speed, and an actuator assembly for writing information to and reading information from circular tracks on the disks. The actuator assembly typically includes a plurality of actuator arms extending towards the disks, with one or more flexures extending from each of the actuator arms. Mounted at the distal end of each of the flexures is a read/write head, which includes an air bearing slider enabling the head to fly in close proximity above the corresponding surface of the associated disk during operation of the disk drive. When the disk drive is powered down, the heads may be moved to a landing zone at an innermost region of the disks where the air bearing sliders are allowed to land on the disk surface as the disks stop rotating. Alternatively, the actuator assembly may move (unload) the heads beyond the outer circumference of the disks so that the heads are supported away from the disk surface by a load/unload ramp when the drive is powered down.

Figure 1:
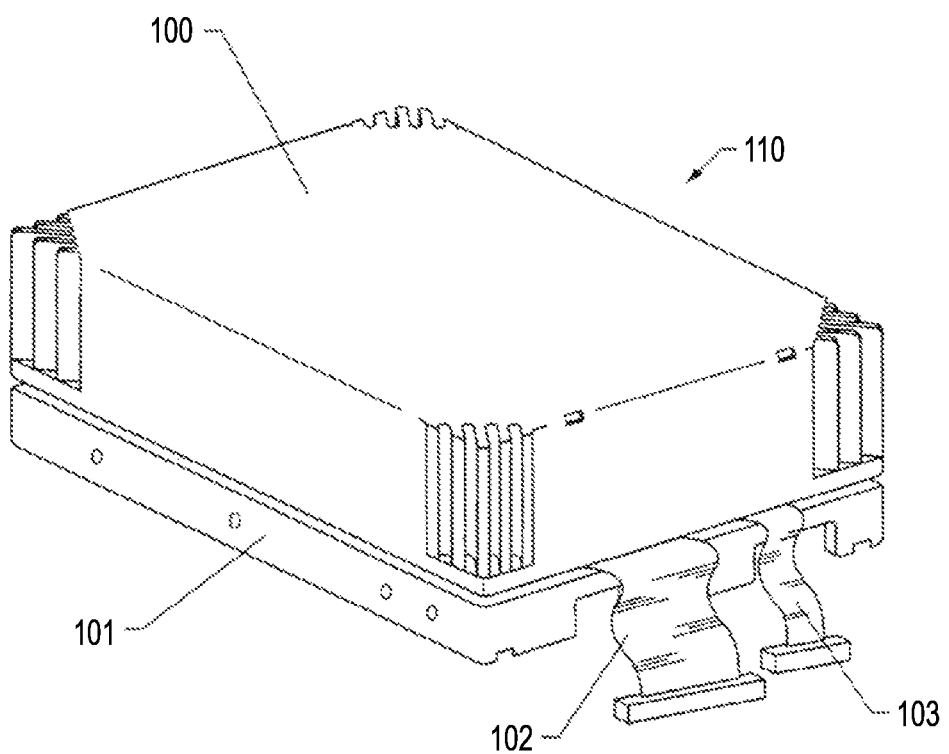
FIG. 1 is a perspective view of a prior art hard disk drive showing flexcircuits exiting the hard disk drive at the junction of the base and cover of the hard disk drive housing.
Figure 2:
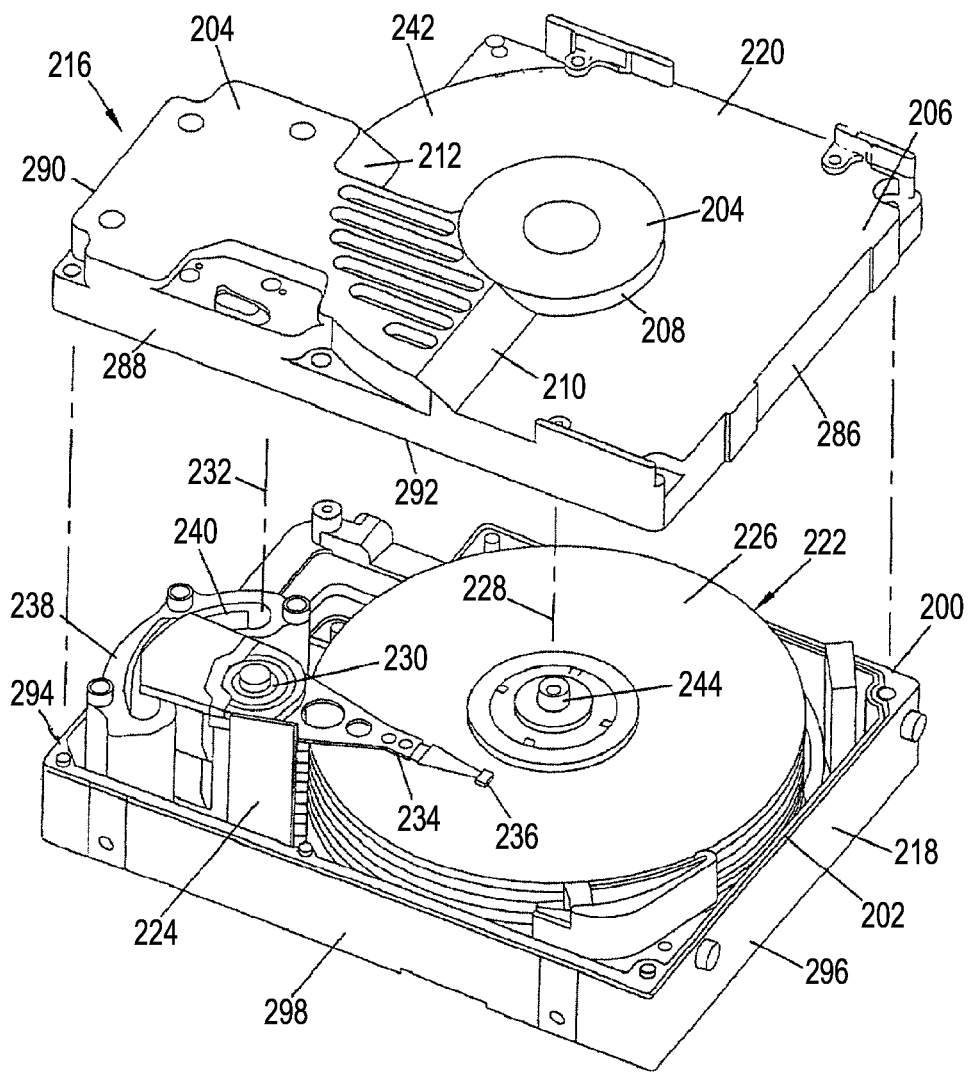
FIG. 2 is a partial perspective view of a prior art hard disk drive with the top cover of the drive housing removed to illustrate certain features.

Turning now to the drawings, there is shown in FIG. 2 part of a prior art hard disk drive 216. The prior art hard disk drive 216 illustrated in FIG. 2 is only one example of many well-known embodiments of hard disk drives and is illustrated to show exemplary components of hard disk drives for use as a reference in conjunction with a description of the present invention. Recognize, however, that many conventional hard disk drives can be modified according to the improvements of the invention.

As shown in FIG. 2, a conventional hard disk drive 216 has a rigid outer housing including a base 218 and a cover 220. In FIG. 2, the cover 220 is removed from the base 218 to reveal a disk pack or spindle assembly 222 and a rotary actuator 224, both of which are mounted movably with respect to the housing formed by the base 218 and cover 220. More particularly, the spindle assembly 222 includes a top disk 226 and several additional concentrically stacked and spaced-apart disks rotatable about a vertical spindle axis 228.

Rotary actuator 224 includes an actuator shaft 230 mounted to pivot relative to the base 218 about a vertical actuator axis 232. Several transducer support arms, including a top support arm 234, are fixed to rotate with the actuator shaft 230. Each arm carries a magnetic data transducing head—e.g., a transducing head 236 on a support arm 234. The rotary actuator 224 pivots to move the transducing head 236 along arcuate paths generally radially with respect to the disks. Selective actuator 224 pivoting, in combination with controlled rotation of the disks, allows reading and recording of data at any desired location at any one of the disk recording surfaces. Rotary actuator 224 is pivoted by selective application of an electrical current to a voice coil 238 supported for arcuate movement within a magnetic field created by a permanent magnet arrangement 240, which includes several magnets and a poll piece (both of which are not illustrated in further detail).

The rotary actuator 224 and spindle assembly 222 are supported between two opposed housing walls, including a top wall 242 of the cover 220 and a bottom wall of the base 218. Spindle shaft 244 and the actuator shaft 230 may be stationary—meaning that they are integral with the housing—with the disks and support arms being mounted to rotate relative to their respective shafts.

The cover 220 includes a vertical continuous sidewall structure including a rearward wall 286, a sidewall 288, and a forward wall 290. Here, the upper sidewall structure includes a generally flat, horizontal continuous bottom edge 292, though some embodiments may include a flange or other mated fitting so as to fit into a top edge 200 of base 218 facilitating a tight fit and/or laser-welding. The base 218 includes an upright wall structure including a forward wall 294, a rearward wall 296, and two opposed sidewalls, one of which is shown at 298. These walls combine to form a continuous, horizontal top edge 200. FIG. 2 also illustrates an elastomeric gasket seal 202 mounted to top edge 200 of the base 218. When the cover 220 is assembled onto the base 218, the confronting bottom edge 292 of the cover 220 and the top edge 200 of the base 218 are brought into sealing engagement to close the housing about the spindle assembly 222 and the rotary actuator 224.

The upper and lower sidewalls 288, 298 are generally relatively thick to lend rigidity to the housing. The top wall 242 of the cover 220 may be formed with a horizontal full height region 204 and a horizontal recessed region 206, the two types of regions being interconnected by several non-horizontal regions as indicated at 208, 210 and 212. One portion of the full height region 204 accommodates the rotary actuator 224 and the spindle assembly 222. The non-horizontal regions 208, 210, 212 provide additional stiffness to the top wall 242 of the cover 220, which strengthens the top wall 242 and enables a somewhat reduced thickness wall construction.

Figure 3A:
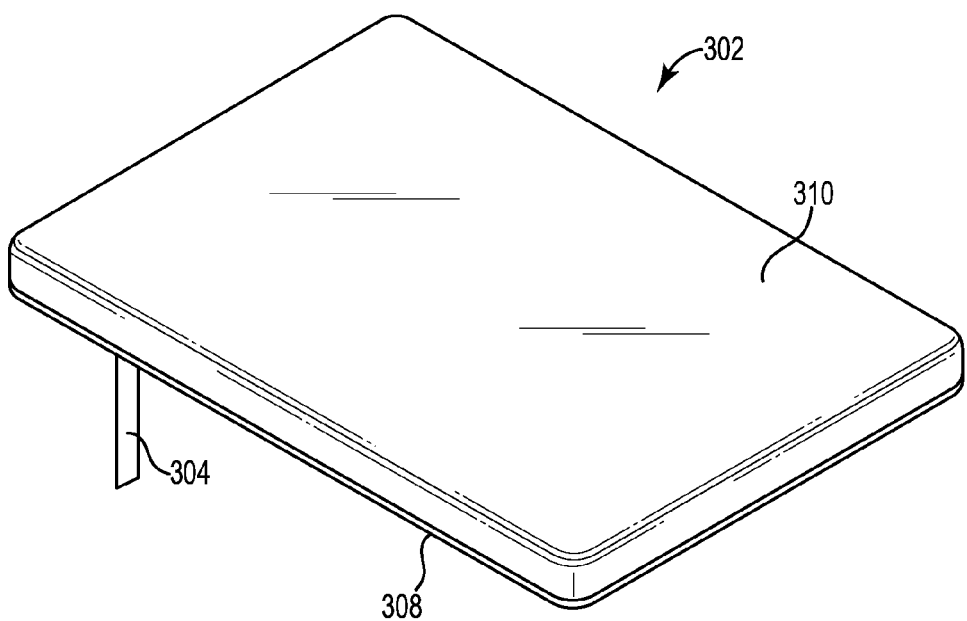
FIG. 3A is a top perspective view of a hard disk drive comprising an electrical connector comprising a flexible circuit extending through an opening in the base.
Figure 3B:
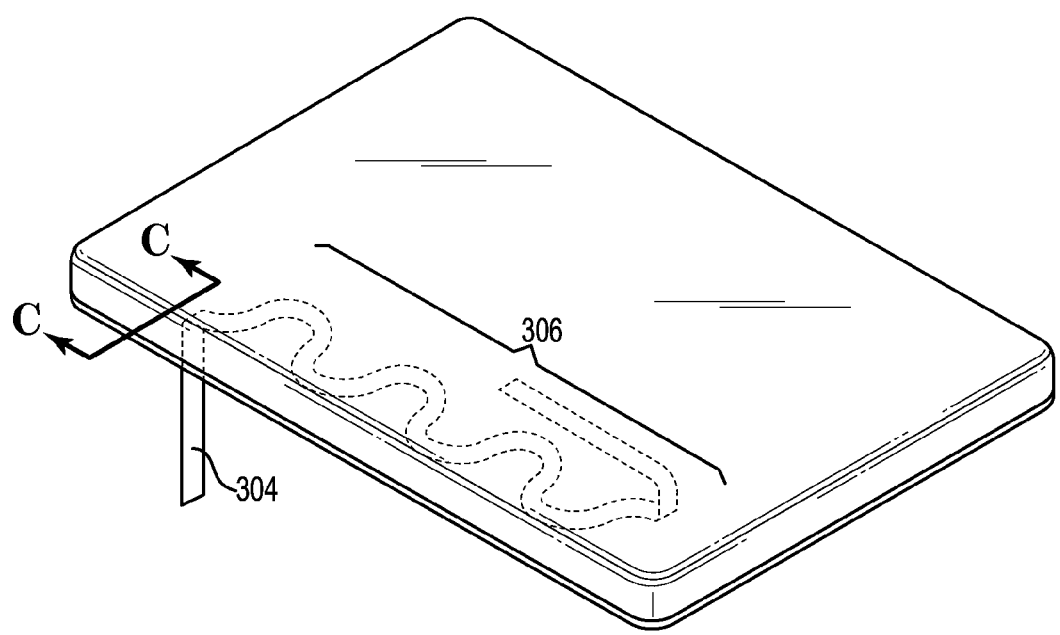
FIG. 3B is a partial phantom top perspective view of the hard disk drive of FIG. 3A, illustrating an exemplary electrical connector thereof.
Figure 3C:
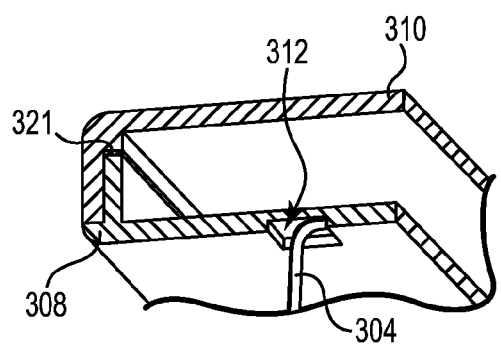
FIG. 3C is a partial cross-sectional view of the hard disk drive of FIG. 3B, taken proximate exit of the electrical connector from the hard disk drive along plane C-C of FIG. 3B.

According to one embodiment of the invention illustrated in FIGS. 3A-3C, an improved hard disk drive 302 of the invention comprises an electrical connector comprising a flexible circuit 304 exiting the hard disk drive 302 from an opening 312 within a base 308 of the hard disk drive housing. The base 308 and cover 310 mate to form an enclosed housing for containment of internal hard disk drive components and containment of any gaseous medium filled therein.

The flexible circuit 304 typically comprises a plurality of electrical conductors encapsulated within an insulating material. The flexible circuit 304 facilitates connection of the hard disk drive 302 to external electrical components. As compared to rigid pin connectors conventionally extending from the base of hard disk drives, use of a flexible circuit 304 for the electrical connector provides more flexibility in design and assembly of components as it has built-in tolerance when used for connecting adjacent components. Further, flexible circuits are generally not subject to precise alignment requirements associated with rigid electrical connectors.

The flexible circuit 304 may perform any needed electrical connection. Further, more than one flexible circuit 304 may exit the hard disk drive 302. Preferably, when more than one flexible circuit 304 exits the hard disk drive 302, each flexible circuit 304 exits the hard disk drive 302 from an opening 312 within the base 308 according to the present invention.

In an exemplary embodiment, the flexible circuit 304 comprises an actuator flex cable that carries electrical signal to and from the actuator of the hard disk drive 302. The actuator flex cable provides electrical contact between electronics external to the housing and the actuator within the hard disk drive 302, which is supported on bearings allowing radial motion of the actuator about its pivot point. The radial motion of the actuator allows the read/write transducers supported on suspensions fixed to the actuator to access data tracks on the disk surfaces located at any radial position from the inside diameter of the disk to the outside diameter of the disk.

According to a further embodiment, the flexible circuit 304 is embedded within the base 308 to form a tortuous path 306 as illustrated in, for example, FIG. 3B. According to this embodiment, the flexible circuit 304 is embedded within the base 308 of the hard disk drive 302. Preferably, when embedded as such, the flexible circuit 304 is positioned therein in a tortuous path 306 to maximize changes of direction (e.g., direction of curvature) within the embedded section of the base 308.

The more tortuous the path, the more changes of direction will occur therein. In one embodiment, the flexible circuit 304 of the invention changes direction at least about three times within the tortuous path 306. In a further embodiment, the flexible circuit 304 changes direction at least about five times within the tortuous path 306. In yet a further embodiment, the flexible circuit 304 changes direction at least about seven times within the tortuous path 306. As such, the embedded flexible circuit 304 comprises a serpentine or labyrinth path through the base 308 according to an exemplary embodiment. By embedding the flexible circuit 304 within a plastic base 308 as such, the likelihood that the path of such a flexible circuit 304 as it exits the hard disk drive 302 will serve as an effective path for leakage of a contained gaseous medium and/or entry of problematic electromagnetic waves is further minimized. Inclusion of such a tortuous path 306 was also found to minimize leakage through the electrical connector itself as compared to electrical connectors associated with conventional configurations of electrical connectors (i.e., both flexible circuits and rigid pin connectors) exiting hard disk drives, which have relatively unobstructed linear paths.

As illustrated in FIG. 3C, a flexible circuit 304 of the invention exits the hard disk drive 302 through an opening 312 within the base 308. In an exemplary embodiment, the opening 312 within the base 308 is non-linear. That is, the opening 312 does not linearly extend through the base 308 between the interior and exterior of the hard disk drive 302. Rather, position of a first end of the opening 312 on the exterior of the hard disk drive 302 is offset from position of a second end of the opening 312 on the interior of the hard disk drive 302. In an exemplary embodiment, the opening 312 extends essentially transversely from the exterior of the hard disk drive 302 to approximately a midpoint of the base 308 in an essentially linear manner, at which point the opening 312 changes direction, extending essentially longitudinally within the base 308 before changing direction and exiting the base 308 essentially transversely toward the interior of the hard disk drive 302.

According to this embodiment, the flexible circuit 304 is embedded within the base 308 using any suitable methodology. Methods for embedding the flexible circuit 304 within the base 308 vary depending on, for example, the material from which the base 308 is fabricated.

In one embodiment, the base 308 comprises multiple layers, with the flexible circuit 304 being embedded between two adjacent layers within the base 308 by fastening the layers around the flexible circuit 304 using any suitable fastening mechanism. For example, the flexible circuit 308 can be positioned on one metal layer forming the base 308, after which time a second metal layer forming the base 308 is securely positioned thereon to form a sandwich structure with the flexible circuit 304 embedded between two metal layers of the base 308.

In another embodiment, the flexible circuit 304 is embedded within a single layer of the base 308. For example, when the base 308 comprises a plastic material, the flexible circuit 304 can be overmolded within the base 308 during injection—or other molding of the base 308. Suitable molding techniques are known to those of ordinary skill in the art.

During the process of enclosing the cover 310 and base 308 around the internal components, any suitable sealing material 321 may be positioned between the cover 310 and the base 308, such as shown in FIG. 3C, for sealing engagement of the hard disk drive housing in an exemplary embodiment. For example, conventional rubber gasket seals or other sealing materials 321 such as irradiation-crosslinked, closed-cell foam (e.g., that commercially available under the VOLARA trade designation—Sekisui Voltek of Lawrence, Mass.) can be used for such a seal.

After enclosing the base 308 and the cover 310 of the hard disk drive housing, with the flexible circuit 304 exiting the hard disk drive 302 through an opening 312 in the base 308, the opening 312 through which the flexible circuit 304 exits the hard disk drive 302 is sealed. Any suitable method may be used for sealing the opening 312. In one embodiment, the opening 312 surrounding the flexible circuit 304 is filled with a potting compound (e.g., an epoxy potting compound such as entrochem 318, available from entrochem, inc. of Columbus, Ohio).

In one embodiment, the base 308 and the cover 310 of the hard disk drive housing are assembled around components internal to the hard disk drive 302 in an environment filled with the desired gaseous medium (when the desired medium is other than atmospheric air). In another embodiment, after enclosing the base 308 and the cover 310 around internal components to the hard disk drive 302 and temporarily sealing the hard disk drive housing using any suitable methodology as known to those skilled in the art, the hard disk drive 302 is evacuated and filled with the desired gaseous medium (when the desired medium is other than atmospheric air). A fill port or other conventional methodology can be used for filling the disk drive with the desired gaseous medium using any suitable methodology as known to those skilled in the art according to this embodiment. The hard disk drive 302 then preferably undergoes routine testing and re-working, if necessary. Advantageously, in preferred embodiments, the flexible circuit 304 need not generally be removed and/or resealed within the opening 312 in the base 308 when re-working the hard disk drive 302. Once the hard disk drive 302 passes such testing, the hard disk drive 302 may be further hermetically sealed using any suitable method.

Advantages associated with hard disk drives and related methods of the present invention include, for example, improved shielding from EMI as well as improved containment of a gaseous medium within an enclosed hard disk drive. Within the sealed environment of hard disk drives of the invention, a gas having a density less than that of atmospheric air can be effectively employed. For example, a gaseous medium comprising at least one of nitrogen, helium, or other noble gases can be employed therein, alone or in combination with one or more of each other and/or air. In an exemplary embodiment, an improved hard disk drive of the invention is capable of providing and maintaining an adequate sealed environment for at least five years. An adequate sealed environment is one in which hard disk drive performance is not significantly affected due to leakage. According to one embodiment, at least about 90% by volume, preferably at least about 95% by volume, of a gaseous medium originally contained within a hard disk drive remains after five years. Any suitable methodology can be used to detect leakage of a gaseous medium from a hard disk drive and amounts thereof.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. Further, while the present invention has been described with respect to a hard disk drive, it should be understood that the present invention also finds utility in other data storage devices—e.g., optical and magneto-optical storage devices.

The invention claimed is:

1. A hard disk drive, comprising:
   a housing comprising a base and a cover;
   at least one disk for storage of data within the housing;
   an actuator for reading and recording of the data on the at least one disk; and
   an electrical connector comprising a flexible circuit embedded within the base of the hard disk drive and flexibly extending through an opening in the base and providing electrical contact between electronics external to the housing and one or more components within the hard disk drive.

2. The hard disk drive of claim 1, wherein the flexible circuit is embedded within a single layer of the base of the hard disk drive.

3. The hard disk drive of claim 1, wherein the base comprises plastic.

4. The hard disk drive of claim 1, wherein the embedded flexible circuit changes direction at least about three times.

5. The hard disk drive of claim 1, wherein the embedded flexible circuit changes direction at least about five times.

6. The hard disk drive of claim 1, wherein the embedded flexible circuit changes direction at least about seven times.

7. The hard disk drive of claim 1, wherein the flexible circuit comprises an actuator flex cable.

8. The hard disk drive of claim 1, wherein the opening within the base is non-linear such that a first end of the opening on an exterior of the hard disk drive is offset from position of a second end of the opening on an interior of the hard disk drive.

9. The hard disk drive of claim 1, wherein a position of a first end of the opening on the exterior of the hard disk drive is offset from a position of a second end of the opening on the interior of the hard disk drive.

10. A hard disk drive, comprising:
a housing comprising a base and a cover;
at least one disk for storage of data within the housing;
an actuator for reading and recording of the data on the at least one disk; and
an electrical connector comprising a flexible circuit embedded within and extending through an opening in the base and providing electrical contact between electronics external to the housing and one or more components within the hard disk drive, wherein the embedded flexible circuit comprises a tortuous path through the base.

11. A method of forming the hard disk drive of claim 10, comprising steps of:
providing the cover for the housing;
providing the base for the housing;
providing the electrical connector comprising the flexible circuit;
positioning the flexible circuit within the opening of the base;
enclosing the cover and the base around components internal to the hard disk drive; and
sealing the opening around the flexible circuit.

12. The method of claim 11, comprising the step of embedding the flexible circuit within the base.

13. The method of claim 12, wherein the flexible circuit is embedded between two adjacent layers within the base.

14. The method of claim 12, wherein the flexible circuit is embedded within a single layer of the base.

15. The method of claim 14, wherein the flexible circuit is overmolded within the base during molding of the base.

16. The method of claim 11, wherein the base comprises plastic.

17. A hard disk drive, comprising:
a housing comprising a base and a cover, wherein the base comprises plastic;
at least one disk for storage of data within the housing;
an actuator for reading and recording of the data on the at least one disk; and
an electrical connector comprising a flexible circuit embedded within and extending through an opening in the base and providing electrical contact between electronics external to the housing and one or more components within the hard disk drive, wherein the flexible circuit is embedded within the base by overmolding the plastic base around the flexible circuit.

18. A hard disk drive, comprising:
a housing comprising a base and a cover;
at least one disk for storage of data within the housing;
an actuator for reading and recording of the data on the at least one disk; and
an electrical connector comprising a flexible circuit embedded within and extending through an opening in the base and providing electrical contact between electronics external to the housing and one or more components within the hard disk drive, wherein the embedded flexible circuit comprises a labyrinth path through the base.

19. A hard disk drive, comprising:
a housing comprising a base and a cover;
at least one disk for storage of data within the housing;
an actuator for reading and recording of the data on the at least one disk; and
an electrical connector comprising a flexible circuit embedded within and extending through an opening in the base and providing electrical contact between electronics external to the housing and one or more components within the hard disk drive, wherein the embedded flexible circuit comprises a serpentine path through the base.

20. A hard disk drive, comprising:
a housing comprising a base and a cover;
at least one disk for storage of data within the housing;
an actuator for reading and recording of the data on the at least one disk; and
an electrical connector comprising a flexible circuit extending through an opening in the base and providing electrical contact between electronics external to the housing and one or more components within the hard disk drive, wherein the opening extends essentially transversely from an exterior of the hard disk drive to approximately a midpoint of the base in an essentially linear manner, at which point the opening changes direction, extending essentially longitudinally within the base before changing direction and exiting the base essentially transversely toward an interior of the hard disk drive.

* * * * *